Jan. 31, 1967  YUTAKA TANAKA ETAL  3,302,083
VARIABLE SYNCHRONOUS MOTORS WHICH ROTATE AT A
SELF-DETERMINED ROTATIONAL SPEED
Filed Oct. 21, 1963
3 Sheets-Sheet 1
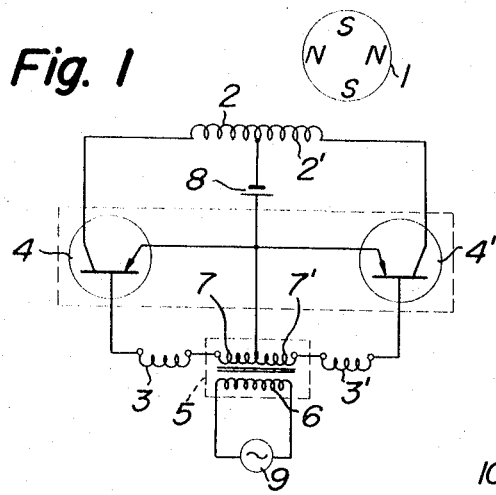
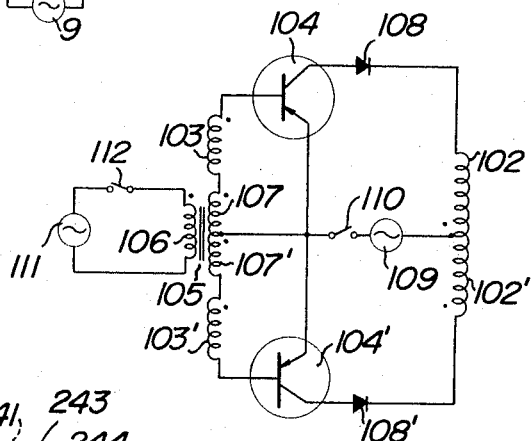
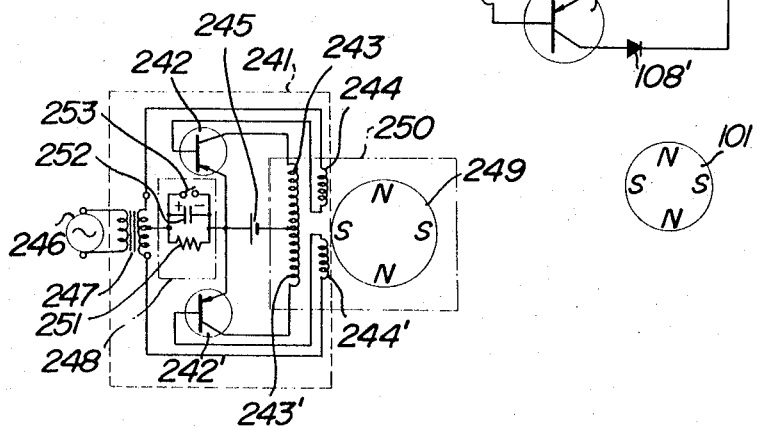
Inventors
Yutaka Tanaka
Kaoru Sasabe
By Stevens, Davis, Miller & Mosher
ATTORNEY Jan. 31, 1967  YUTAKA TANAKA ETAL  3,302,083
VARIABLE SYNCHRONOUS MOTORS WHICH ROTATE AT A
SELF-DETERMINED ROTATIONAL SPEED
Filed Oct. 21, 1963  3 Sheets-Sheet 3

Inventor
Yutaka Tanaka
Kaoru Sasabe
By Stevens, Davis, Miller & Mosher
ATTORNEYS

United States Patent Office 3,302,083
Patented Jan. 31, 1967

3,302,083
VARIABLE SYNCHRONOUS MOTORS WHICH ROTATE AT A SELF-DETERMINED ROTATIONAL SPEED
Yutaka Tanaka, Kobe, and Kaoru Sasabe, Ikeda-shi, Japan, assignors to Matsushita Electric Industrial Co., Ltd., Osaka, Japan, a corporation of Japan
Filed Oct. 21, 1963, Ser. No. 317,693
Claims priority, application Japan, Oct. 25, 1962, 37/47,720; Nov. 17, 1962, 37/51,631; Dec. 19, 1962, 37/58,155; Sept. 5, 1963, 38/68,188
5 Claims. (Cl. 318—138)

The present invention relates to a synchronous motor being able to be rotated following an external signal frequency over a wide range wherein field coils are composed of coils of a switching circuit having switching elements such as transistors or semiconductor rectifiers with control electrodes, and a rotor of a permanent magnet is provided so that the permanent magnet rotor is continuously rotated by an electromagnetic force between the rotor and a magnetic field induced in the field coils by the action of the switching circuit, and an external synchronizing signal is applied to said switching circuit to rotate the permanent magnet rotor in synchronous relation at a synchronous rotational speed corresponding to a frequency $f$ of said external synchronizing signal, said permanent magnet rotor being subsequently capable of making synchronous rotation relative to the frequency of such external synchronizing signal irrespective of a load applied to the motor.

The invention is characterized in that, in the motor of the type described, a pick-up coil in which a voltage is induced during the rotation of the permanent magnet rotor is connected in series with a secondary coil of a coupling transformer for impressing said external synchronizing signal on control terminals of said switching circuit.

An object of the invention is to provide a variable synchronous motor wherein the number of revolutions of the permanent magnet rotor can automatically and accurately be pulled in to synchronize in a quite simple manner with an external synchronizing signal without requiring any special means of comparing the frequency corresponding to the number of revolutions of said rotor with the frequency of said external synchronizing signal after the rotation has been started.

Another object of the invention is to provide a variable synchronous motor of the character described which, when driven by an A.C. source, can especially easily and accurately be synchronized with an external synchronizing signal.

Still another object of the invention is to provide a variable synchronous motor in which a fixing torque between the permanent magnet rotor and a stator is reduced to permit the starting by as small starting torque as possible and to be pulled in to synchronize smoothly and moreover to cancel an irregular rotation of the permanent magnet rotor, and in which electrical braking is effected by changing over the polarity of coils in said switching circuit.

When a synchronous motor of the type is adapted for use with a power source having widely variable voltage, it is generally required that the motor develop a required output even at the lowest source voltage, and thus the motor output will unnecessarily increase at a higher source voltage. Further, a high driving current is generally developed in a motor of the type wherein an external synchronizing signal is applied to the switching circuit to rotate the permanent magnet rotor in synchronism with the external synchronizing signal.

Therefore, another object of the invention is to provide a variable synchronous motor of said character wherein a driving current is controlled so that the motor output can be automatically maintained at a predetermined value at all times, and wherein useless consumption of a battery can be avoided when such battery is used as a power source to drive the motor.

According to the invention, there is provided a variable synchronous motor wherein driving field coils are composed of coils of a swtiching circuit having switching elements therein, and a rotor of a permanent magnet is provided so that said permanent magnet rotor is continuously rotated by an electromagnetic force between said rotor and a magnetic field induced in said driving field coils by the action of the switching circuit, and wherein an external synchronizing signal is applied to said switching circuit to rotate said permanent magnet rotor in synchronous relation at a synchronous rotational speed corresponding to a frequency of said external synchronizing signal, said permanent magnet rotor being subsequently capable of making synchronous rotation relative to the frequency of said external synchronizing signal irrespective of a load applied to said motor; said motor comprising pick-up coils in which a voltage is induced during the rotation of said permanent magnet rotor, and a coupling transformer for impressing said external synchronizing signal on control terminals of said switching circuit, said pick-up coils being connected in series with secondary coils of said coupling transformer.

There are other objects and particularities of the invention which will become obvious from the following description with reference to the accompanying drawings, in which:

FIG. 1 is an electrical circuit diagram of a variable synchronous motor of the invention adapted to be driven by a D.C. source;

FIG. 2 is an electrical circuit diagram of a variable synchronous motor of the invention adapted to be driven by an A.C. source;

FIG. 5 is an electrical circuit diagram of further another embodiment of the invention;

Figure 3:
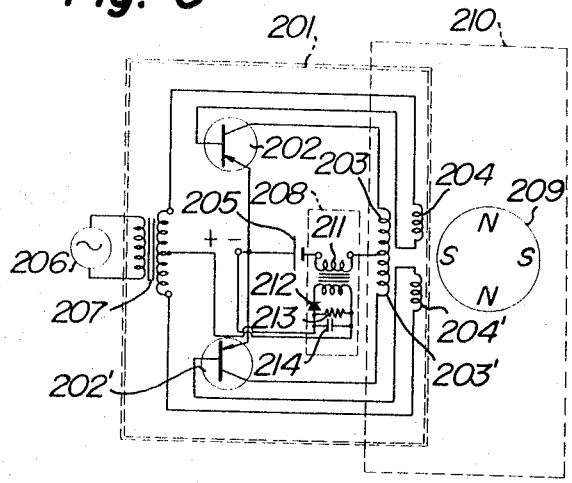
FIG. 3 is an electrical circuit diagram of another embodiment of the invention.

Referring to FIG. 1, there is shown an electrical connection diagram of a variable synchronous motor, which comprises a permanent magnet rotor 1, and field coils composed of driving coils 2 and 2' and pick-up coils 3 and 3' wound about a stator core. Upon rotation of the permanent magnet rotor 1, a voltage at a frequency corresponding to a number of revolutions of the permanent magnet rotor 1 is induced in the pick-up coils 3 and 3'.

The driving coils 2 and 2' are connected with respective emitters and collectors of transistors 4 and 4' through a D.C. source 8. The pick-up coils 3 and 3' are connected in series with secondary coils 7 and 7' of a coupling transformer 5 for an external synchronizing signal, respectively. These series circuits constitute a push-pull transistor switching circuit. The coupling transformer 5 has a primary coil 6, on which the external synchronizing signal 9 is impressed. The external synchronizing signal, in turn, is impressed on said transistor switching circuit through said transformer 5.

Although the push-pull transistor switching circuit is employed in this embodiment, a single circuit or parallel circuit may be used in lieu thereof, provided that secondary coils of the coupling transformer are connected in series with pick-up coils.

The variable synchronous motor of FIG. 1 operates in the following manner. When no external synchronizing signal is impressed on the coupling transformer 5, the stator poles are magnetized to drive the rotor by a current flowing through the driving coils 2 and 2' due to the oscillating action of the circuits of the transistors 4 and 4'. The oscillatory action of the transistors 4 and 4' is controlled by a voltage induced in the pick-up coils 3 and 3' by the rotation of the permanent magnet rotor 1, which therefore rotates at the intrinsic number of revolutions.

Upon impression of the external synchronizing signal on the primary coil 6 of the coupling transformer 5 after the motor has been started, it is supposed that a voltage within a suitable frequency range (for example, the frequency of the order of 180 to 300 cycles against a frequency of the external synchronizing signal of 200 cycles) is induced in the pick-up coils 3 and 3' at the intrinsic number of revolutions of the motor. Since the pick-up coils 3 and 3' are connected in series with the secondary coils 7 and 7' of the coupling transformer 5, respectively, the switching action of the transistors 4 and 4' is affected by the external synchronizing signal, and the number of revolutions of the permanent magnet rotor 1 gradually approaches a synchronous number of revolutions corresponding to the frequency of the external synchronizing signal, with the voltage induced in the pick-up coils 3 and 3' simultaneously approaching the external synchronizing signal. Then, when the frequency and phase of the voltage induced in the pick-up coils 3 and 3' approximately correspond with those of the external synchronizing signal, the permanent magnet rotor 1 rotates in synchronism with the frequency of the external synchronizing signal, and subsequently continues to make synchronous rotation at a speed which varies in accordance with any change in the external synchronizing signal.

Although the motor may be started with the external synchronizing signal impressed thereon at the beginning of the starting, the signal may preferably be impressed after a suitable time after starting since the synchronization can more easily and accurately be attained.

From the foregoing description, it will be understood that the voltage induced in the pick-up coils and the secondary coils of the coupling transformer is utilized to control the switching action of the switching elements to thereby attain the on-off control of the exciting current flowing through the driving coils. Therefore, it will be apparent that the motor can automatically be pulled in to rotate at the number of revolutions which is the synchronous speed corresponding to the external synchronizing signal, and such synchronization can be attained in an extremely simple and accurate manner by establishing a suitable relation between the intrinsic number of revolutions of the motor when no such signal is applied thereto and the frequency of such external synchronization signal, without requiring any other means for synchronization.

The embodiment of FIG. 1 has referred to the case of driving the motor by the D.C. source, but an embodiment which will be explained with reference to FIG. 2 illustrates a case of driving such motor by an A.C. source.

A variable synchronous motor of FIG. 2 comprises a permanent magnet rotor 101 and driving coils 102 and 102' wound about a stator. Pick-up coils in which a voltage is induced upon rotation of the permanent magnet rotor 101 are denoted by numerals 103 and 103'. The driving coil 102 is connected to the emitter and collector of a transistor 104 in series with a protective diode 108, an A.C. source 109 and a switch 110, while the driving coil 102' is connected to the emitter and collector of a transistor 104' in series with a protective diode 108', the A.C. source 109 and the switch 110. The pick-up coils 103 and 103' are connected with secondary coils 107 and 107' of a coupling transformer 105 for an external synchronizing signal, respectively. These series circuits are connected to the respective emitters and bases of the transistors 104 and 104' to constitute a push-pull transistor switching circuit. An external synchronizing signal 111 is impressed through a switch 112 on a primary coil 106 of the coupling transformer 105, thence transmitted to said transistor switching circuit.

Although the push-pull transistor switching circuit is employed in this embodiment, a single circuit or parallel circuit may be used in lieu thereof, provided that the secondary coils of the coupling transformer are connected in series with the pick-up coils. Further, switching elements such as silicon controlled rectifiers may be used in place of the transistors 104 and 104', and the protective diodes 108 and 108' may not necessarily be required depending on the switching elements employed.

After the permanent magnet rotor 101 has been started with the switch 110 closed, the switching action of the transistors 104 and 104' is controlled by a voltage induced in the pick-up coils 103 and 103' by the rotation of the permanent magnet rotor 101 and the stator is excited by a current flowing through the field coils 102 and 102'. Then, the number of revolutions of the motor makes a gradual increase until finally the intrinsic number of revolutions thereof is reached. The motor makes a high speed rotation at its intrinsic number of revolutions irrespective of the number of revolutions by the A.C. source, if the intrinsic number of revolutions of the motor is considerably different from the synchronous revolution corresponding to the frequency of such A.C. source 109. Then, upon impression of the external synchronizing signal 111 on the primary coil 106 of the coupling transformer 105, the switching action of the transistors 104 and 104' is controlled by the external synchronizing signal 111, and the motor rotates in synchronism with the signal 111.

Thus, it will be understood that, by connecting the pick-up coils in series with the secondary coils of the coupling transformer, the motor driven by the A.C. source can be automatically pulled in to rotate at the synchronous speed corresponding to the external synchronizing signal, and such synchronization can be attained in an extremely simple and accurate manner without requiring any other means for obtaining synchronization.

Defects of the variable synchronous motor as described above reside in that the motor output uselessly increases at a high source voltage since the predetermined motor output must be developed even with a lowest source voltage, and that a great driving current is generally required when the external synchronizing signal is applied to the switching circuit to rotate the rotor in synchronism with such signal.

Figure 4:
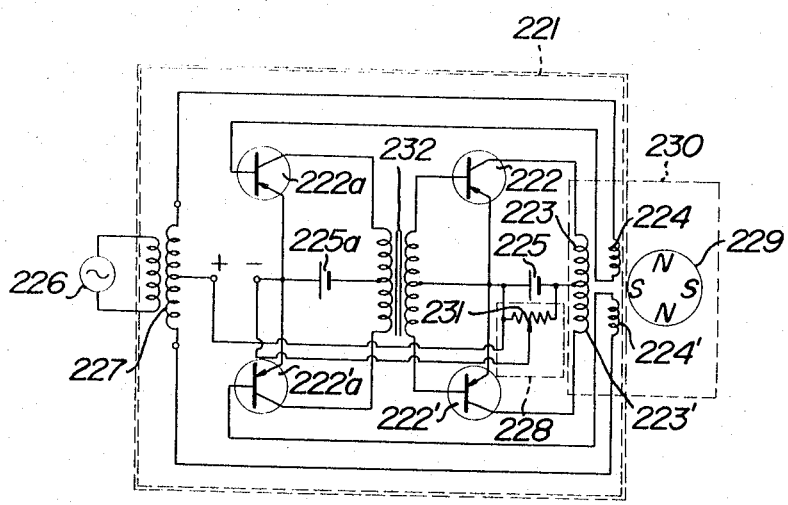
FIG. 4 is an electrical circuit diagram of still another embodiment of the invention.

FIGS. 3 to 5 show other embodiments of the invention, wherein means are provided in a motor similar to that of FIG. 1 to automatically maintain the motor output at a predetermined value at all times to thereby avoid useless consumption of a source battery.

In FIG. 3, a motor driving circuit 201 comprises transistors 202 and 202', field coils 203 and 203', pick-up coils 204 and 204', a D.C. source 205, and a coupling transformer 207 for an external synchronizing signal 206, and a detection circuit 208 is incorporated in the circuit 201. The field coils 203 and 203', and the pick-up coils 204 and 204' are wound about a stator to form a variable synchronous motor 210 in cooperation with a permanent magnet rotor 209. The detection circuit 208 comprises a transformer 211, a diode 212, a resistance 213 and a condenser 214.

Switching action of the transistors 202 and 202' is actuated by a voltage induced in the pick-up coils 204 and 204' by the rotation of the permanent magnet rotor 209. This switching action is effective to control a driving current flowing through the field coils 203 and 203' to thereby continuously rotate the permanent magnet rotor 209. Then, upon impression of the external synchronizing signal 206 on the coupling transformer 207, the switching action is controlled by the signal and the permanent magnet rotor 209 rotates in synchronism with a synchronous speed corresponding to the frequency of the external synchronizing signal 206. During this action, the detection circuit 208 detects any variation in the driving current and applies a voltage of a magnitude proportionate to the driving current to the bases of the transistors 202 and 202′ in the form of a bias voltage, thus effecting to reduce the driving current if it is excessively high.

In a motor shown in FIG. 4, means are provided to detect any variation in a source voltage to thereby maintain the motor output at a predetermined value. The motor of FIG. 4 likewise comprises a permanent magnet rotor 229, field coils 223 and 223′, and pick-up coils 224 and 224′. An external synchronizing signal 226 is impressed on a primary coil of a coupling transformer 227. A variable resistance 231 is connected to both terminals of a D.C. source 225 to form a detection circuit. In this arrangement, a voltage proportional to the voltage of the D.C. source 225 is impressed, in the form of a bias voltage, on the bases of transistors 222a and 222a′, so that a driving current is reduced at a high source voltage to maintain the predetermined motor output.

A motor shown in FIG. 5 comprises a permanent magnet rotor 249, field coils 243 and 243′, and pick-up coils 244 and 244′. An external synchronizing signal 246 is likewise impressed on a primary coil of a coupling transformer 247. In FIG. 5, a control circuit 248 comprises a resistance 251, a condenser 252 and a switch 253 is connected to base circuits of transistors 242 and 242′. The arrangement of FIG. 5 takes advantage of such characteristics that an electromotive force corresponding to a driving current is induced in the pick-up coils 244 and 244′, as a result of which a base current has a certain relation with the driving current, and the motor output varies depending on the magnitude of the base current.

Thus, a bias is automatically applied due to a rectifying action between the bases and emitters of the transistors 242 and 242′ to thereby maintain the predetermined motor output.

The circuit arrangements shown in FIGS. 3 to 5 are similar to that of FIG. 1, and the secondary coils of the coupling transformer are connected inseries with the pick-up coils to facilitate the synchronization with the external synchronizing signal. Moreover, the driving source voltage or driving current is detected by the detection circuit, and the output of the detection circuit corresponding to the source voltage or driving current is utilized to control the switching circuit to thereby control the driving current at the predetermined value. Therefore, the motor output is always automatically maintained at the predetermined value irrespective of any variation in the source voltage and useless consumption of a battery as power source can be avoided.

Figure 6:
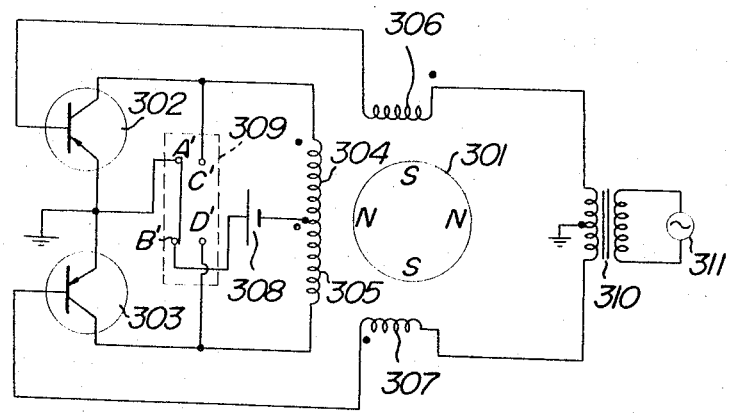
FIG. 6 is an electrical circuit diagram of an embodiment of the invention provided with electrical braking means.
Figure 7:
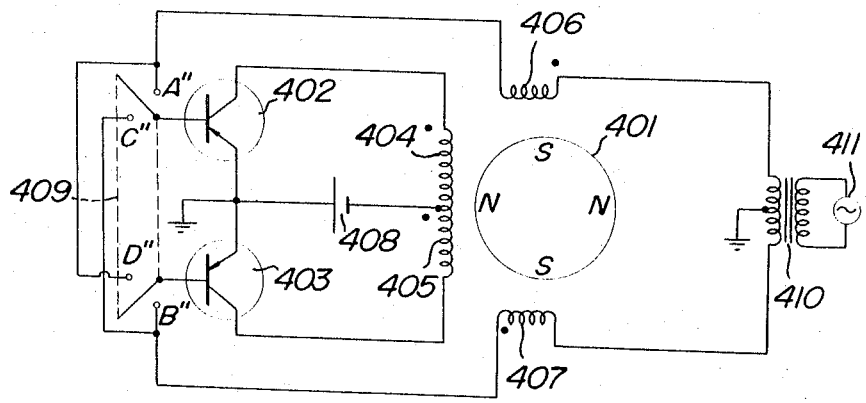
FIG. 7 is an electrical circuit diagram of a modification of the motor shown in FIG. 6.

FIGS. 6 and 7 illustrate embodiments of a variable synchronous motor having electrical braking means.

The variable synchronous motor of FIG. 6 comprises a permanent magnet rotor 301. Field coils of the motor are composed of collector coils 304 and 305 of transistors 302 and 303, respectively, and pick-up coils 306 and 307, which are wound about stator poles. As in the previous cases, a voltage is induced in the pick-up coils 306 and 307 by the rotation of the permanent magnet rotor 301. The transistors 302 and 303, collector coils 304 and 305, and pick-up coils 306 and 307 constitute a push-pull transistor switching circuit as shown in FIG. 6. A secondary coil of a coupling transformer 310 is connected in series with the pick-up coils 306 and 307, while an external synchronizing signal 311 is impressed on a primary coil of the transformer 310. In the switching circuit, there are provided a battery 308, and a change-over switch 309 having contacts C′ and D′ for short-circuiting the collector coils.

In said circuit, contacts A′ and B′ of the switch 309 are normally closed during the operation of the motor, and the permanent magnet rotor 301 makes a continuous rotation in synchronism with the external synchronizing signal 311 as described in the foregoing. When it is desired to exert braking on the rotor 301, the change-over switch 309 may be actuated to short circuit the contacts C′ and D′. Therefore, the battery 308 is cut off from the circuit and at the same time the collector coils 304 and 305 are made to short circuit with each other, with the result that a short-circuit current flows through the collector coils 304 and 305 due to the voltage induced in the collector coils by the rotation of the permanent magnet rotor 301. A magnetic field generated by this short-circuit current is effective to exert a braking force on the permanent magnet rotor 301, which will be forced to stop in a short time.

In FIG. 7, an arrangement is made to exert regenerative braking by the switchover of pick-up coils. The circuit of FIG. 7 is analogous to that of FIG. 6, and comprises transistors 402 and 403, collector coils 404 and 405, pick-up coils 406 and 407, a battery 408 and a change-over switch 409. The motor includes a permanent magnet rotor 401, and an external synchronizing signal 411 is impressed on a primary coil of a coupling transformer 410.

Contacts A″ and B″ of the switch 409 are normally closed during the operation of the motor, and the permanent magnet rotor 401 makes a continuous rotation. When the rotor 401 is to be braked, the change-over switch 409 may be changed over to close contacts C″ and D″. Then, polarities of the pick-up coils 406 and 407, and the secondary coil of the coupling transformer 410 for controlling the switching action of the transistors 402 and 403 are reversed with respect to the case of the normal running, and an abrupt braking force is exerted on the permanent magnet rotor 401 to stop its rotation.

Further, in the variable synchronous motor of FIG. 1, the number of field poles of the stator may preferably be made twice as many as the number of magnetic poles of the permanent magnet rotor. Then, in a stationary position of the permanent magnet rotor, the poles of the rotor oppose the field poles of the stator, but the field poles of the stator are also disposed between every two poles of the rotor. With such arrangement, it will be apparent that, the fixing torque of the motor during starting will be markedly reduced to thereby minimize the torque required for starting. In other words, ampere turns for starting will be extremely reduced and the starting characteristic of the motor can be improved. Moreover, the fluttering of the rotor during its revolution may also be eliminated. A pull-in characteristic is also greatly improved.

What is claimed is:

1. A variable synchronous motor wherein driving field coils are composed of coils of a switching circuit having switching elements therein, and a rotor of a permanent magnet is provided so that said permanent magnet rotor is continuously rotated by an electromagnetic force between said rotor and a magnetic field induced in said driving field coils by the action of the switching circuit, and wherein an external synchronizing signal is applied to said switching circuit to rotate said parmanent magnet rotor in synchronism with a frequency of said external synchronizing signal, said permanent magnet rotor being subsequently capable of making synchronous rotation relative to the frequency of said external synchronizing signal irrespective of a variation of a load applied to said motor; said motor comprising pick-up coils in which a voltage is induced by the rotation of said permanent magnet rotor, and a coupling transformer for impressing said external synchronizing signal on control terminals of said switching circuit, said pick-up coils being connected in series with secondary coils of said coupling transformer.

2. A variable synchronous motor according to claim 1, said motor which is adapted to be driven by an A.C. source.

3. A variable synchronous motor comprising a coupling transformer for impressing an external synchronizing signal on control side of a switching circuit, pick-up coils in which a voltage is induced by the rotation of a permanent magnet rotor, said pick-up coils being connected in series with secondary coils of said coupling transformer, and a detection circuit for detecting a driving source voltage or driving current, said detection circuit being operative in a manner that said switching circuit is controlled by an output of said detection circuit corresponding to the driving source voltage or driving current to thereby control said driving current at a predetermined value.

4. A variable synchronous motor according to claim 1, wherein said secondary coils of said coupling transformer and said pick-up coils are connected to said control terminals of said switching circuit in a manner that their polarities can be freely reversed as required.

5. A variable synchronous motor according to claim 1 wherein a switch means is provided for short circuiting said driving coils.

References Cited by the Examiner
UNITED STATES PATENTS

| | | | |
|---|---|---|---|
| 2,814,008 | 11/1957 | Staniloff | 318—138 |
| 2,995,690 | 8/1961 | Lemon | 318—171 X |
| 3,025,443 | 3/1962 | Wilkinson et al. | 318—138 |
| 3,098,958 | 7/1963 | Katz | 318—138 |
| 3,121,832 | 2/1964 | Haskell et al. | 318—138 |
| 3,214,663 | 10/1965 | Kreutzer | 318—254 X |

ORIS L. RADER, *Primary Examiner.*

G. RUBINSON, *Assistant Examiner.*